United States Patent

Hara et al.

Patent Number: 5,543,094
Date of Patent: Aug. 6, 1996

[54] METHOD OF FORMING A MULTILAYER MOLDED ARTICLE

[75] Inventors: Takahisa Hara, Kawanishi; Masahito Matsumoto, Osaka; Nobuhiro Usui, Osaka; Shigeyoshi Matubara, Osaka, all of Japan

[73] Assignee: Sumitomo Chemical Company, Limited, Osaka, Japan

[21] Appl. No.: 395,190

[22] Filed: Feb. 27, 1995

Related U.S. Application Data

[63] Continuation of Ser. No. 969,439, Oct. 30, 1992, abandoned.

[30] Foreign Application Priority Data

Oct. 31, 1991 [JP] Japan .................................. 3-286298

[51] Int. Cl.⁶ .................... B29C 44/14; B29C 45/14; B29C 70/48
[52] U.S. Cl. .................... 264/46.4; 264/255; 264/257; 264/258; 264/259; 264/266
[58] Field of Search .................... 264/255, 257, 264/258, 45.1, 46.4, 259, 266; 156/245, 242

[56] References Cited

U.S. PATENT DOCUMENTS

| | | | |
|---|---|---|---|
| 3,021,721 | 2/1962 | Hooven | 264/257 |
| 3,492,392 | 1/1970 | Kasamatsu et al. | 264/313 |
| 3,869,337 | 3/1975 | Hoppe et al. | 264/257 |
| 4,276,346 | 6/1981 | Bramwell | 264/257 |
| 4,298,556 | 11/1981 | Rutsch et al. | 264/257 |
| 4,829,644 | 5/1989 | Kondo et al. | 264/257 |
| 4,873,041 | 10/1989 | Masui et al. | 264/257 |
| 4,873,045 | 10/1989 | Fujita et al. | 264/257 |
| 4,891,176 | 1/1990 | Drysdale | 264/257 |
| 5,006,188 | 4/1991 | Usui et al. | 156/245 |
| 5,053,179 | 10/1991 | Masui et al. | 264/257 |

FOREIGN PATENT DOCUMENTS

| | | |
|---|---|---|
| 0013468 | 7/1980 | European Pat. Off. . |
| 0333198 | 9/1989 | European Pat. Off. . |
| 2114181 | 10/1972 | Germany . |
| 61-123541 | 6/1986 | Japan . |
| 62-041032 | 2/1987 | Japan . |
| 2006667 | 5/1979 | United Kingdom . |
| 2206835 | 1/1989 | United Kingdom . |

*Primary Examiner*—Jay H. Woo
*Assistant Examiner*—Duane S. Smith
*Attorney, Agent, or Firm*—Birch, Stewart, Kolasch & Birch, LLP

[57] ABSTRACT

A method of forming a multilayer molded article with improved appearance having a core of a thermoplastic resin and a skin material laminated on the resin core, in which the skin material is made of a fabric which is lined with a nonwoven fabric having a weight of at least 50 g/m² and an elongation at break of 20% to 80% and optionally has an intermediate foam layer between the fabric and the nonwoven fabric.

10 Claims, 2 Drawing Sheets

METHOD OF FORMING A MULTILAYER MOLDED ARTICLE

This application is a continuation of application Ser. No. 07/969,439 field on Oct. 30, 1992, now abandoned.

BACKGROUND OF THE INVENTION

1. Field of the Invention

The present invention relates to a multilayer molded article with a good appearance which is used as an interior panel of an automobile or an electric appliance and a method for producing the same.

2. Description of the Related Art

Today, various molded articles of thermoplastic resins are known, on surfaces of which a skin material is laminated to increase their grade through improvement of their beauty and soft feeling.

One of the methods for producing such a multilayer molded article comprises molding an article of a thermoplastic resin by a suitable molding method such as injection molding and laminating a skin material which has been formed by, for example, a vacuum forming on the surface of the molded article using an adhesive.

Another method comprises placing a skin material on a mold for molding an article, closing the mold, injecting a mass of a molten thermoplastic resin in the closed mold to laminate the resin with the skin material, cooling the mold and then removing the molded article from the mold.

A further method comprises placing a skin material between upper and lower molds, supplying a mass of a molten thermoplastic resin in the unclosed molds, and closing the molds to integrate the resin and the skin material.

However, the above methods have following drawbacks.

When adhesive is used to adhere the skin material to the already molded article, the production steps are complicated so that the production cost increases. In addition, a solvent or a dispersant contained in the adhesive may pollute the environment.

In the method comprising injecting the resin melt in the closed mold, when the resin melt is injected in the mold, the resin at high temperature and high pressure contacts the skin material and presses the skin material strongly, so that the surface of the skin material is discolored or a design of the skin material is deformed. In a case of a skin material made of a raised fabric, the appearance is worsened since the raised fibers are laid down or oriented. In some cases, the resin melt reaches the surface of the skin material to impair the commercial value of the molded article.

When the molten thermoplastic resin is supplied in the unclosed molds in which the skin material is placed, it is possible to produce a good molded article by precisely defining a clearance between the upper and lower molds and a mold closing speed as proposed in Japanese Patent Kokai Publication No. 235613/1989 (U.S. Ser. No. 07/700,936). Depending on a kind or a quality of the skin material, the fibers may be laid down or the resin exudes on the skin material.

SUMMARY OF THE INVENTION

One object of the present invention is to provide a multilayer molded article having a skin material with good appearance, which does not suffer from lying down of the fabric, exudation of the resin, wrinkles or breakage of the skin material or flow wrinkles due to flow of the thermoplastic resin.

Another object of the present invention is to provide a method for producing such a multilayer molded article.

According to a first aspect of the present invention, there is provided a multilayer molded article comprising a core of a thermoplastic resin and a skin material laminated on the resin core wherein the skin material is made of a fabric which is lined with a nonwoven fabric having a weight of at least 50 g/m$^2$ and an elongation at break of 20% to 80% and optionally has an intermediate foam layer between the fabric and the nonwoven fabric.

According to a second aspect of the present invention, there is provided a method for producing a multilayer molded article comprising steps of placing a skin material between unclosed upper and lower molds, supplying a mass of a molten thermoplastic resin and closing the molds to integrate the skin material and the thermoplastic resin, wherein the skin material is made of a fabric which is lined with a nonwoven fabric having a weight of at least 50 g/m$^2$ and an elongation at break of 20% to 80% and optionally has an intermediate foam layer between the fabric and the nonwoven fabric.

DETAILED DESCRIPTION OF PREFERRED EMBODIMENTS

Figure 1A:
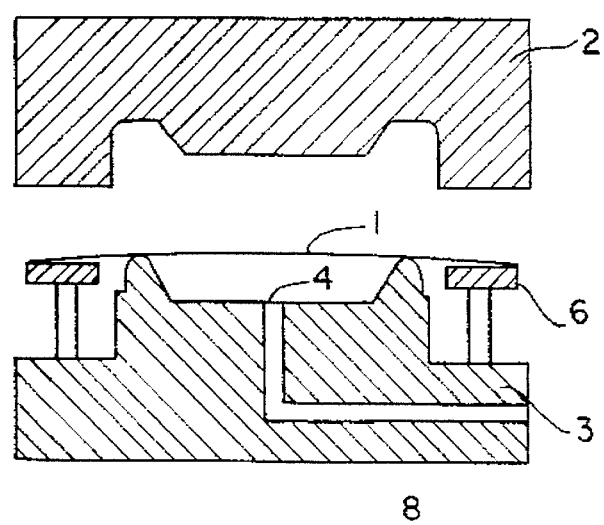
FIGS. 1A, 1B and 1C show sequential steps for forming a multilayer molded article according to the present invention.

The "fabric" herein used includes woven, nonwoven and knit fabrics. Fibers of the fabric may be natural fibers such as cotton, wool, silk, hemp, etc. and synthetic fibers such as polyamide fiber, polyester fiber, etc. The fabric may be of any type such as plain weave, moquette and the like. A knit fabric such as tricot or jersey may be used. The fabric may be made of each fiber or a mixed fiber. The woven fabric may be produced by any of conventional methods such as needle punching, thermal bonding, spun bonding, melt blowing or spun lacing.

The nonwoven fabric used as a lining may be made of any fiber, for example, a natural fiber such as cotton, wool, silk, hemp, etc. or a synthetic fiber such as polyamide fiber, polyester fiber, etc. The woven fabric may be made of each fiber or a mixed fiber. The woven fabric may be produced by any of conventional methods such as needle punching, thermal bonding, spun bonding, melt blowing or spun lacing.

The skin material may have an intermediate foam layer between the fabric and the nonwoven fabric lining. As the foam, polyurethane foam, polypropylene foam or polyvinyl chloride foam may be used.

As the thermoplastic resin to be molded by the process of the present invention, any conventionally used in compression molding, injection molding and extrusion molding can be used. Examples of the thermoplastic resins to be used according to the present invention are polyethylene, polypropylene, copolymers comprising ethylene or propylene, ABS resin, styrene base resins, polyamide resin, polyester resin, polymer alloys or mixtures thereof. Optionally, the resin may contain at least one additive such as inorganic fillers, pigments, blowing agents, lubricants, antistatic agents, stabilizers and the like.

Since the nonwoven fabric is bonded to the thermoplastic resin not by heat bonding but by an anchoring effect of the molten thermoplastic resin which penetrates into spaces among the fibers of the nonwoven fabric, good bonding is achieved irrespective of the kind of the thermoplastic resin which forms a core of the multilayer molded article.

The weight of the nonwoven fabric should be at least 50 g/m². When this weight is smaller than 50 g/m², heat of the molten thermoplastic resin is not sufficiently insulated, the skin material suffers from lying down of the fibers or the resin exudes on the skin material surface.

The elongation at break of the nonwoven fabric is from 20% to 80%. When the elongation at break is smaller than 20%, the nonwoven fabric does not follow the shape of the article so that the skin material may be broken or wrinkled at corners of the article. When the elongation at break is larger than 80%, the nonwoven fabric flows together with the molten thermoplastic resin which flows in the mold cavity when the nonwoven fabric is laminated to the resin in the mold.

In a preferred embodiment of the method of the present invention, the skin material is placed between the unclosed upper and lower mold, and the upper mold is lowered to start the mold closing. Then, the mold closing action is stopped or the mold closing rate is decreased to 30 mm/sec. or lower. When the cavity clearance reaches a distance between (c+100)mm and (c+5)mm (wherein c is a cavity clearance at the completion of the molding), the resin melt is supplied between the skin material and one of the molds.

If the resin melt is supplied when the cavity clearance is larger than (c+100)mm, the surface of the resin melt mass is cooled and shrinks freely so that unevenness tends to be formed on the surface of the solidified resin mass and, in turn, the unevenness of the resin mass is transferred to the skin material, whereby the unevenness appears on the skin material surface. If the resin melt is supplied when the cavity clearance is smaller than (c+5) mm, excessive heat and pressure are applied on the skin material near an opening for supplying the resin melt, so that the skin material is depressed near the opening for supplying the resin melt, and various drawbacks tend to appear, for example, the unevenness is formed on the skin material surface, the raised fibers are laid down, or the embossed skin material is debossed.

When the mold closing speed is larger than 30 mm/sec., the excessive pressure is applied to the skin material near the opening for supplying the resin melt so that the feeling of the skin material tends to be damaged.

EXAMPLES

The present invention will be explained further in detail by the following Examples.

Example 1

The molding was carried out using a vertical pressing machine having a clamping force of 30 tons and a horizontally resin melt-supplying part. As a skin material, a fabric (TRICOT TR #109 manufactured by KAWASHIMA ORIMONO CO., LTD., a polyester pile fabric) was used which was lined with a polyester spun bond nonwoven fabric (TORAY ACSTAR B505-10 manufactured by TORAY CO., LTD.; a weight of 50 g/m² and an elongation at break of 22%). As a thermoplastic resin, a polypropylene (SUMITOMO NOBLEN AZ 564 manufactured by Sumitomo Chemical Co., Ltd.; with a melt flow index of 30 g/10 min.) was used.

As shown in FIG. 1, a pair of molds 2, 3 were used. To the lower mold 3, a skin material-fixing frame 6 which was vertically movable with a hydraulic pressure was provided. The upper mold 2 was attached to a vertically movable upper platen of a pressing machine (not shown), while the lower mold 3 was attached to a fixed lower platen of the pressing machine (not shown).

Figure 1B:
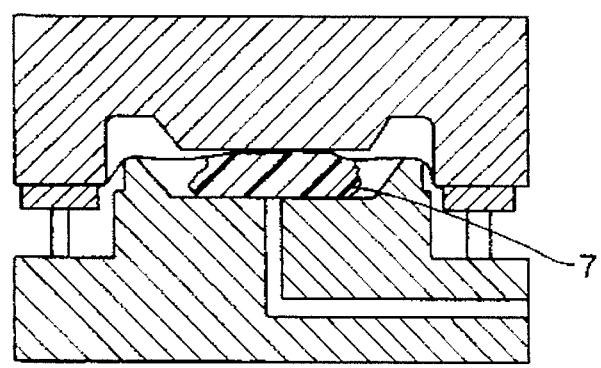
Figure 1C:
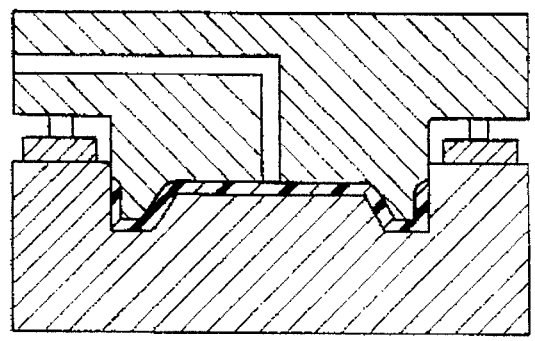

The skin material 1 was placed on the lower mold 3 as shown in FIG. 1A and then the upper mold 2 was lowered. When the cavity clearance reached 30 mm, the lowering of the upper mold 2 was stopped temporarily, and a mass of a molten thermoplastic resin 7 heated at 190° C. was supplied from a resin supply opening 4 through a conduit 8 (FIG. 1B). As soon as the resin supply was finished, the lowering of the upper mold 2 was restarted at a rate of 8 mm/sec. to press the resin mass, whereby the skin material was laminated on the molded resin mass (FIG. 1C). After cooling and opening the molds, the multilayer molded article was removed from the molds.

Figure 2A:
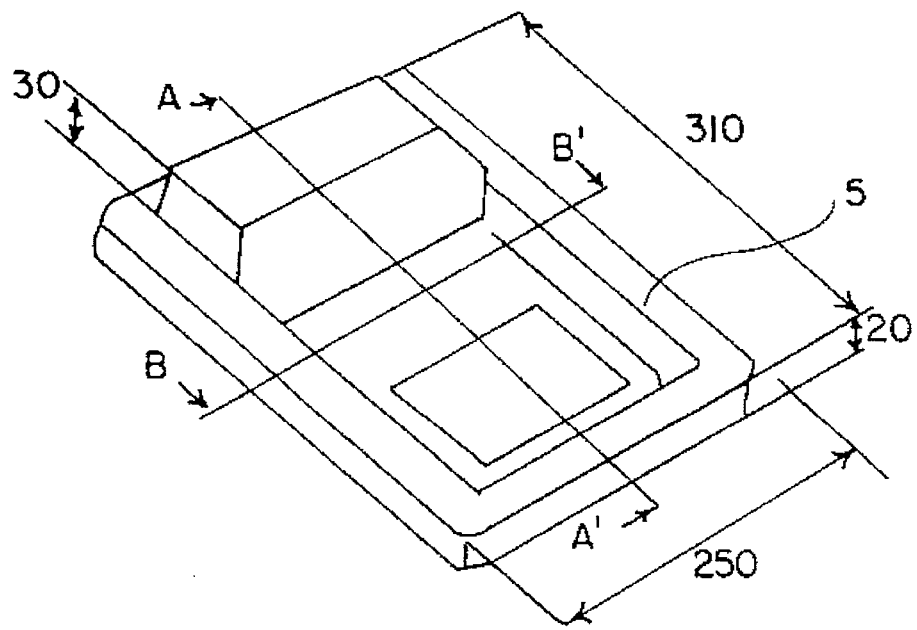
FIG. 2A shows a perspective view of the molded article.
Figure 2B:
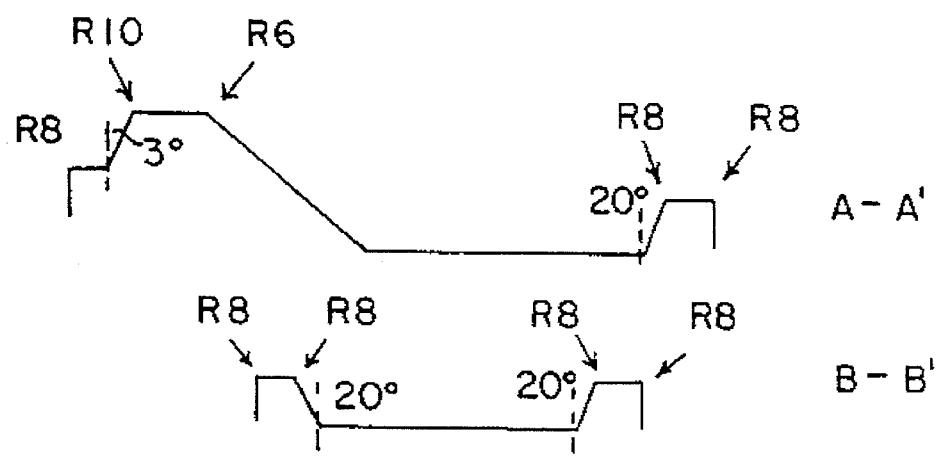
FIG. 2B shows two cross sections taken along lines A—A' and B—B', respectively, of FIG. 2A.
Figure 3:
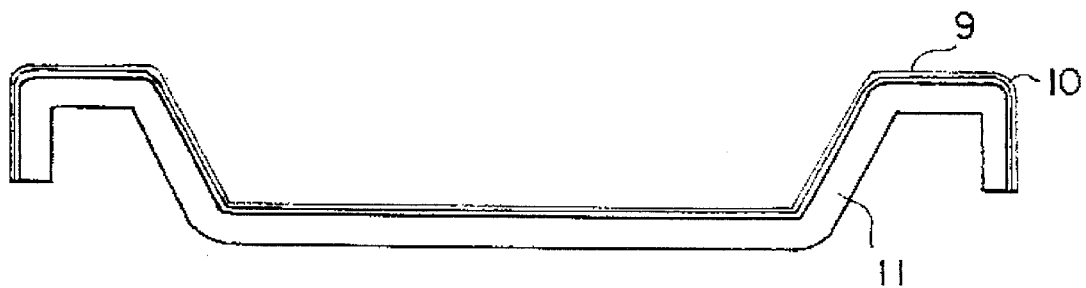
FIG. 3 shows an enlarged cross-section along line B—B' of FIG. 2A.

The molded article had a thickness of 2.5 mm and sizes (in "mm") shown in FIGS. 2A and 2B. FIG. 2A shows a perspective view of the molded article 5. FIG. 2B shows two cross sections of the molded articles along the lines A—A' and B—B', respectively. FIG. 3 shows the enlarged cross section of the molded article along the line B—B', in which 9, 10 and 11 stand for a fabric, a nonwoven fabric and a resin core.

The appearance of the article was good and no fiber was laid down, the resin was not exuded on the skin material, and the skin material was not broken or wrinkled.

Comparative Example 1

In the same manner as in Example 1 but using, as a lining material, a polyester spun bond nonwoven fabric (TORAY ACSTAR B505-21 manufactured by TORAY CO., LTD.; a weight of 40 g/m² and an elongation at break of 18%), a multilayer molded article was produced. Though the raised fiber was not laid down, the skin material was wrinkled at the corners.

Comparative Example 2

In the same manner as in Example 1 but using, as a lining material, a polyester spun bond nonwoven fabric (TORAY ACSTAR-B505-10 manufactured by TORAY CO., LTD.; a weight of 40 g/m² and an elongation at break of 25%), a multilayer molded article was produced. Though the skin material was not broken or wrinkled at the corners, the resin was exuded through weave interstices of the fabric at the corners, and the fibers were laid down on the article surface.

Example 2

In the same manner as in Example 1 but using, as a lining material, a polyester needle punch nonwoven fabric (TORAY ACSTAR D515-10 manufactured by TORAY CO., LTD.; a weight of 150 g/m² and an elongation at break of 80%), a multilayer molded article was produced.

The appearance of the article was good and the skin material was not broken or wrinkled at the corners, the resin was not exuded on the skin material, and no fiber was laid down.

The materials of the skin materials used in Examples and Comparative Examples are summarized in Table 1, and the appearance evaluation of the molded articles are listed in Table 2.

TABLE 1

| Example No. | Fabric | Intermediate foam | Nonwoven fabric lining material | | |
| --- | --- | --- | --- | --- | --- |
| | | | Trade name | Weight (g/m$^2$) | Elongation at break (%) |
| 1 | TRICOT TR #109 | — | TORAY ACSTAR B505-10 | 50 | 22 |
| 2 | TRICOT TR #109 | — | TORAY ACSTAR D515-10 | 150 | 80 |
| 3 | MOQUETTE M-6-K1185B | — | TORAY ACSTAR D515-10 | 150 | 80 |
| 4 | MOQUETTE M-6-K1185B | PPAM 25030 | TORAY ACSTAR D515-10 | 150 | 80 |
| C. 1 | TRICOT TR #109 | — | TORAY ACSTAR B505-21 | 50 | 18 |
| C. 2 | TRICOT TR #109 | — | TORAY ACSTAR B504-10 | 40 | 25 |
| C. 3 | TRICOT TR #109 | — | TORAY ACSTAR C315-10 | 150 | 85 |

Comparative Example 3

In the same manner as in Example 1 but using, as a lining material, a polyester needle punch nonwoven fabric (TORAY ACSTAR C315-10 manufactured by TORAY CO., LTD.; a weight of 150 g/m$^2$ and an elongation at break of 85%), a multilayer molded article was formed. Though the raised fiber was not laid down, the fabric surface was wrinkled due to the flow of the molten thermoplastic resin.

Example 3

In the same manner as in Example 1 but using, as a fabric, a polyester pile fabric (MOQUETTE M-6-K1185B manufactured by KAWASHIMA ORIMONO CO., LTD.) and as a lining material, a polyester needle punch nonwoven fabric (TORAY ACSTAR D515-10 manufactured by TORAY CO., LTD.; a weight of 150 g/m$^2$ and an elongation at break of 80%), a multilayer molded article was formed.

The appearance of the article was good and the skin material was not broken or wrinkled at the corners, the resin was not exuded on the skin material, and no fiber was laid down.

Example 4

In the same manner as in Example 1 but using, as a fabric, a polyester pile fabric (MOQUETTE M-6-K1185B manufactured by KAWASHIMA ORIMONO CO., LTD.), as an intermediate foam layer, a polypropylene foam (TORAY PPAM 25030 manufactured by TORAY CO., LTD.; 25 times blowing/3 mm thickness) and as a lining material, a polyester needle punch nonwoven fabric (TORAY ACSTAR D515-10 manufactured by TORAY CO., LTD.; a weight of 150 g/m$^2$ and an elongation at break of 80%, a multilayer molded article was formed.

The appearance of the article was good and the skin material was not broken or wrinkled at the corners, the resin was not exuded on the skin material, and no fiber was laid down.

TABLE 2

| | Appearance of molded article | | |
| --- | --- | --- | --- |
| Example No. | Wrinkles, breakage (Corners/Flat face) | Exudation of resin at the corners | Laying down of the fabric |
| 1 | No/No | No | No |
| 2 | No/No | No | No |
| 3 | No/No | No | No |
| 4 | No/No | No | No |
| C. 1 | Yes/No | Yes | No |
| C. 2 | No/No | No | Yes |
| C. 3 | No/Yes | No | No |

What is claimed is:

1. A method for producing a multilayer molded article comprising steps of:

placing a skin material between unclosed upper and lower molds;

supplying a mass of a molten thermoplastic resin; and closing the molds to integrate the skin material and the thermoplastic resin, wherein the skin material is made of a fabric which is lined with a nonwoven fabric having a weight of at least 50 g/m$^2$ and an elongation at break of 20% to 80%.

2. The method according to claim 1, wherein said skin material comprises an intermediate foam layer between said fabric and said nonwoven fabric.

3. The method according to claim 1, wherein said mass of the molten thermoplastic resin is supplied when a cavity clearance between the upper and lower molds reaches a distance between (c+100)mm and (c+5)mm wherein c is a cavity clearance at completion of the molding.

4. The method according to claim 1, wherein said skin material is a polyester pile fabric.

5. The method according to claim 1, wherein said mass of molten thermoplastic resin is selected from the group consisting of polyethylene, polypropylene, copolymers comprising ethylene or propylene, styrene base resins, polyamide resin, polyester resin, polymer alloys or mixtures thereof.

6. The method according to claim 1, wherein said fabric includes woven, nonwoven and knit fabrics.

7. The method according to claim 1, wherein said fabric is a woven fabric.

8. The method according to claim 1, wherein said fabric is made of cotton, wool, silk, hemp, polyamide fiber or polyester fiber.

9. The method according to claim 2, wherein said intermediate foam layer is comprised of polyurethane foam, polypropylene foam, or polyvinyl chloride foam.

10. The method according to claim 5, wherein said mass of thermoplastic resin is an ABS resin.

* * * * *